(12) United States Patent
Hamada

(10) Patent No.: US 7,206,289 B2
(45) Date of Patent: Apr. 17, 2007

(54) METHOD OF AND APPARATUS FOR CALCULATING TRAFFIC FROM DATA ON PACKET TRANSMISSION COLLECTED FROM ROUTERS

(75) Inventor: Tsuneo Hamada, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 1127 days.

(21) Appl. No.: 10/059,396

(22) Filed: Jan. 31, 2002

(65) Prior Publication Data

US 2002/0105915 A1    Aug. 8, 2002

(30) Foreign Application Priority Data

Feb. 6, 2001    (JP)    .............................. 2001-029097

(51) Int. Cl.
*H04L 12/26*    (2006.01)
(52) U.S. Cl. ...................... 370/252; 370/253; 370/401; 709/223; 709/224
(58) Field of Classification Search ................ 370/252, 370/253, 401; 709/223, 224
See application file for complete search history.

(56) References Cited

U.S. PATENT DOCUMENTS 5,886,643 A * 3/1999 Diebboll et al. ............ 709/224
6,278,694 B1 * 8/2001 Wolf et al. .................. 370/253
6,279,037 B1 * 8/2001 Tams et al. .................. 709/224

* cited by examiner

*Primary Examiner*—Hassan Kizou
*Assistant Examiner*—Brian T O'Connor
(74) *Attorney, Agent, or Firm*—Venable LLP; Michael A. Sartori

(57) ABSTRACT

In a method of managing traffic, routing tables and Use columns are collected from routers included in a network and stored router by router. A calculation table is produced for calculating the number of packets sent. It is determined whether or not a subject router has relayed information, on the basis of the next router listed on the calculation table. If the answer of this decision is positive, a value produced by subtracting the number of packets relayed is used as the number of packets sent between the subject router and the destination network segment. The resultant number of packets is recorded in a router-to-network traffic distribution matrix. All destination network segments belonging to each router are searched for. The data stored in the rows corresponding to the destination network segments are added to each other to thereby produce a router-to-router traffic distribution matrix.

9 Claims, 16 Drawing Sheets

*Fig.3*

| Prot | Destination | Mask | NextRouter | Metric | Interface | Use |
|---|---|---|---|---|---|---|
| C | 10.1.1.0 | 255.255.255.0 | – | 1 | if2 | 12345 |
| C | 10.1.2.0 | 255.255.255.0 | – | 1 | if3 | 2356 |
| R | 10.1.3.0 | 255.255.255.0 | 10.1.9.253 | 2 | if0 | 32546 |
| R | 10.1.4.0 | 255.255.255.0 | 10.1.9.253 | 2 | if0 | 6554 |
| R | 10.1.5.0 | 255.255.255.0 | 10.1.9.253 | 3 | if0 | 9877 |
| R | 10.1.6.0 | 255.255.255.0 | 10.1.9.253 | 3 | if0 | 45499 |
| R | 10.1.7.0 | 255.255.255.0 | 10.1.12.253 | 2 | if1 | 98787 |
| R | 10.1.8.0 | 255.255.255.0 | 10.1.12.253 | 2 | if1 | 68987 |
| R | default | 0.0.0.0 | 10.1.9.253 | 2 | if0 | 69658 |

Fig. 4

R1 ROUTING TABLE (409)

| Destination | NextRouter | If | Use |
|---|---|---|---|
| Net1 | – | if2 | a1 |
| Net2 | – | if3 | b1 |
| Net3 | R2 | if0 | c1 |
| Net4 | R2 | if0 | d1 |
| Net5 | R2 | if0 | e1 |
| Net6 | R2 | if0 | f1 |
| Net7 | R4 | if1 | g1 |
| Net8 | R4 | if1 | h1 |
| default | R2 | if0 | i1 |

Fig. 5

R2 ROUTING TABLE (409)

| Destination | NextRouter | If | Use |
|---|---|---|---|
| Net1 | R1 | if0 | a2 |
| Net2 | R1 | if0 | b2 |
| Net3 | – | if1 | c2 |
| Net4 | – | if2 | d2 |
| Net5 | R3 | if3 | e2 |
| Net6 | R3 | if3 | f2 |
| Net7 | R4 | if4 | g2 |
| Net8 | R4 | if4 | h2 |
| default | R3 | if3 | i2 |

Fig. 6

R3 ROUTING TABLE (409)

| Destination | NextRouter | If | Use |
|---|---|---|---|
| Net1 | R4 | if3 | a3 |
| Net2 | R4 | if3 | b3 |
| Net3 | R2 | if0 | c3 |
| Net4 | R2 | if0 | d3 |
| Net5 | – | if1 | e3 |
| Net6 | – | if2 | f3 |
| Net7 | R4 | if3 | g3 |
| Net8 | R4 | if3 | h3 |
| default | – | if2 | i3 |

| Destination | NextRouter | If | Use |
|---|---|---|---|
| Net1 | R1 | if3 | a4 |
| Net2 | R1 | if3 | b4 |
| Net3 | R2 | if4 | c4 |
| Net4 | R2 | if4 | d4 |
| Net5 | R3 | if0 | e4 |
| Net6 | R3 | if0 | f4 |
| Net7 | – | if1 | g4 |
| Net8 | – | if2 | h4 |
| default | R3 | if0 | i4 |

R4 ROUTING TABLE

Fig.10

| | | SOURCE ROUTER | | | |
| --- | --- | --- | --- | --- | --- |
| | | R1 | R2 | R3 | R4 |
| DESTINATION ROUTER | R1 | | 1 | | 1 |
| | R2 | 1 | | 1 | 1 |
| | R2 | | 1 | | 1 |
| | R3 | 1 | 1 | 1 | |
| DESTINATION NETWORK | 1 | 1 | | | |
| | 2 | 1 | | | |
| | 3 | | 1 | | |
| | 4 | | 1 | | |
| | 5 | | | 1 | |
| | 6 | | | def | |
| | 7 | | | | 1 |
| | 8 | | | | 1 |

| | | SOURCE ROUTER | | | |
| --- | --- | --- | --- | --- | --- |
| | | R1 | R2 | R3 | R4 |
| DESTINATION NETWORK | Net1 | — | | | |
| | Net2 | — | | | |
| | Net3 | | — | | |
| | Net4 | | — | | |
| | Net5 | | | — | |
| | Net6 | | | — | |
| | Net7 | | | | — |
| | Net8 | | | | — |

~112

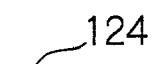
CALCULATION TABLE RELATING TO Net3
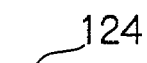
CALCULATION TABLE RELATING TO Net4
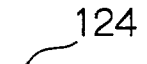
CALCULATION TABLE RELATING TO Net5

Fig. 15

| Router Index | Destination | NextRouter | Use |
|---|---|---|---|
| R1 | Net6 | R2 | f1 |
| R2 | Net6 | R3 | f2 |
| R3 | Net6 | – | f3 |
| R4 | Net6 | R3 | f4 |

CALCULATION TABLE RELATING TO Net6

Fig. 16

| Router Index | Destination | NextRouter | Use |
|---|---|---|---|
| R1 | Default | R2 | i1 |
| R2 | Default | R3 | i2 |
| R3 | Default | – | i3 |
| R4 | Default | R3 | i4 |

CALCULATION TABLE RELATING TO DEFAULT ROUTER

Fig. 17

| Router Index | Destination | NextRouter | Use |
|---|---|---|---|
| R1 | Net7 | R4 | g1 |
| R2 | Net7 | R4 | g2 |
| R3 | Net7 | R4 | g3 |
| R4 | Net7 | – | g4 |

CALCULATION TABLE RELATING TO Net7

Fig. 18

| Router Index | Destination | NextRouter | Use |
|---|---|---|---|
| R1 | Net8 | R4 | h1 |
| R2 | Net8 | R4 | h2 |
| R3 | Net8 | R4 | h3 |
| R4 | Net8 | – | h4 |

CALCULATION TABLE RELATING TO Net8

Fig. 19

| Router Index | Destination | NextRouter | Use |
|---|---|---|---|
| R1 | Net1 | – | a1 |
| R2 | Net1 | R1 | a2 |
| R3 | Net1 | R4 | a3 |
| R4 | Net1 | R1 | a4 |

CALCULATION TABLE RELATING TO Net1

Fig. 20

| Router Index | Destination | NextRouter | Use |
|---|---|---|---|
| R1 | Net2 | – | b1 |
| R2 | Net2 | R1 | b2 |
| R3 | Net2 | R4 | b3 |
| R4 | Net2 | R1 | b4 |

CALCULATION TABLE RELATING TO Net2

Fig.21

| | | SOURCE ROUTER | | | |
|---|---|---|---|---|---|
| | | R1 | R2 | R3 | R4 |
| DESTINATION NETWORK | Net1 | – | a2 | a3 | a4-a3 |
| | Net2 | – | b2 | b3 | b4-b3 |
| | Net3 | c1 | – | c3 | c4 |
| | Net4 | d1 | – | d3 | d4 |
| | Net5 | e1 | e2-e1 | – | e4 |
| | Net6 | f1+i1 | f2-i1+i2-i1 | – | f4+i4 |
| | Net7 | g1 | g2 | g3 | – |
| | Net8 | h1 | h2 | h3 | – |

| | | SOURCE ROUTER | | | |
|---|---|---|---|---|---|
| | | R1 | R2 | R3 | R4 |
| DESTINATION ROUTER | R1 | – | | | |
| | R2 | | – | | |
| | R3 | | | – | |
| | R4 | | | | – |

| | | SOURCE ROUTER | | | |
|---|---|---|---|---|---|
| | | R1 | R2 | R3 | R4 |
| DESTINATION ROUTER | R1 | – | a2+b2 | a3+b3 | a4−a3+b4−b3 |
| | R2 | c1+d1 | – | c3+d3 | c4+d4 |
| | R3 | e1+f1+i1 | f2−f1+e2−e1+i2−i1 | – | e4+f4+i4 |
| | R4 | g1+h1 | g2+h2 | g3+h3 | – |

211

| Interface | ifOutPkts | ifOutOctets |
|---|---|---|
| if0 | 4536 | 1357884 |
| if1 | 15660 | 6546900 |
| if2 | 1239 | 309750 |
| if3 | 63554 | 25421600 |

Fig.27

| Interface | ifOutPkts | ifOutOctets |
|---|---|---|
| if0 | l1 | v1 |
| if1 | m1 | w1 |
| if2 | n1 | x1 |
| if3 | o1 | y1 |

| Interface | ifOutPkts | ifOutOctets |
|---|---|---|
| if0 | l2 | v2 |
| if1 | m2 | w2 |
| if2 | n2 | x2 |
| if3 | o2 | y2 |
| if4 | p2 | z2 |

| Interface | ifOutPkts | ifOutOctets |
|---|---|---|
| if0 | l3 | v3 |
| if1 | m3 | w3 |
| if2 | n3 | x3 |
| if3 | o3 | y3 |

| Interface | ifOutPkts | ifOutOctets |
|---|---|---|
| if0 | l4 | v4 |
| if1 | m4 | w4 |
| if2 | n4 | x4 |
| if3 | o4 | y4 |
| if4 | p4 | z4 |

| Destination Network | ifOutPkts | ifOutOctets |
|---|---|---|
| Net1 | n1 | x1 |
| Net2 | o1 | y1 |
| Net3 | m2 | w2 |
| Net4 | n2 | x2 |
| Net5 | m3 | w3 |
| Net6 | n3 | x3 |
| Net7 | m4 | w4 |
| Net8 | n4 | x4 |

| Destination Network | MeanL3PacketLength |
|---|---|
| Net1 | $(x1'-x1)/(n1'-n1)-hd$ |
| Net2 | $(y1'-y1)/(o1'-o1)-hd$ |
| Net3 | $(w2'-w2)/(m2'-m2)-hd$ |
| Net4 | $(x2'-x2)/(n2'-n2)-hd$ |
| Net5 | $(w3'-w3)/(m3'-m3)-hd$ |
| Net6 | $(x3'-x3)/(n3'-n3)-hd$ |
| Net7 | $(w4'-w4)/(m4'-m4)-hd$ |
| Net8 | $(x4'-x4)/(n4'-n4)-hd$ |

| | | SOURCE ROUTER | | | |
|---|---|---|---|---|---|
| | | R1 | R2 | R3 | R4 |
| DESTINATION NETWORK | Net1 | – | D7 | D13 | D19 |
| | Net2 | – | D8 | D14 | D20 |
| | Net3 | D1 | – | D15 | D21 |
| | Net4 | D2 | – | D16 | D22 |
| | Net5 | D3 | D9 | – | D23 |
| | Net6 | D4 | D10 | – | D24 |
| | Net7 | D5 | D11 | D17 | – |
| | Net8 | D6 | D12 | D18 | – |

| | | SOURCE ROUTER | |
|---|---|---|---|
| | | R1 | R2 |
| DESTINATION NETWORK | Net1 | – | $D7*((x1'-x1)/(n1'-n1)-hd)$ |
| | Net2 | – | $D8*((y1'-y1)/(o1'-o1)-hd)$ |
| | Net3 | $D1*((w2'-w2)/(m2'-m2)-hd)$ | – |
| | Net4 | $D2*((x2'-x2)/(n2'-n2)-hd)$ | – |
| | Net5 | $D3*((w3'-w3)/(m3'-m3)-hd)$ | $D9*((w3'-w3)/(m3'-m3)-hd)$ |
| | Net6 | $D4*((x3'-x3)/(n3'-n3)-hd)$ | $D10*((x3'-x3)/(n3'-n3)-hd)$ |
| | Net7 | $D5*((w4'-w4)/(m4'-m4)-hd)$ | $D11*((w4'-w4)/(m4'-m4)-hd)$ |
| | Net8 | $D6*((x4'-x4)/(n4'-n4)-hd)$ | $D12*((x4'-x4)/(n4'-n4)-hd)$ |

| | | R3 | R4 |
|---|---|---|---|
| DESTINATION NETWORK | Net1 | $D13*((x1'-x1)/(n1'-n1)-hd)$ | $D19*((x1'-x1)/(n1'-n1)-hd)$ |
| | Net2 | $D14*((y1'-y1)/(o1'-o1)-hd)$ | $D20*((y1'-y1)/(o1'-o1)-hd)$ |
| | Net3 | $D15*((w2'-w2)/(m2'-m2)-hd)$ | $D21*((w2'-w2)/(m2'-m2)-hd)$ |
| | Net4 | $D16*((x2'-x2)/(n2'-n2)-hd)$ | $D22*((x2'-x2)/(n2'-n2)-hd)$ |
| | Net5 | – | $D23*((w3'-w3)/(m3'-m3)-hd)$ |
| | Net6 | – | $D24*((x3'-x3)/(n3'-n3)-hd)$ |
| | Net7 | $D17*((w4'-w4)/(m4'-m4)-hd)$ | – |
| | Net8 | $D18*((x4'-x4)/(n4'-n4)-hd)$ | – |

―814

METHOD OF AND APPARATUS FOR CALCULATING TRAFFIC FROM DATA ON PACKET TRANSMISSION COLLECTED FROM ROUTERS

BACKGROUND OF THE INVENTION

1. Field of the Invention

The present invention relates to a network managing system and more particularly to a traffic managing method of clearly grasping the traffic of the entire network and an apparatus for practicing the same.

2. Description of the Background Art

It is a common practice with a network to collect the statistics on traffic. One of conventional schemes for collecting traffic statistics on a network uses an RMON2 (Remote network MONitoring 2) feature particular to an SNMP (Simple Network Management Protocol). The RMON2 feature includes an MIB (Management Information Base) referred to as nlMatrix. The nlMatrix MIB indicates statistics on the transfer of L3 (Layer 3) packets switched via any desired network segment. More specifically, the nlMatrix MIB collects information on the headers of L3 packets and stores statistics between end-to-end terminals in the form of a matrix of destination L3 addresses and source L3 addresses. The statistics include the total number of packets transferred and the total number of octets transferred.

The RMON2 feature is installed in a router, which transfers L3 packets, in the form of software or LSI (Large-Scale Integration) circuit for filtering packets, or in the form of monitoring device exclusively directed to packet filtering. An NMS (Network Management System) that manages a telecommunications network uses the SNMP to collect the statistics from routers or monitoring devices having the RMON2 feature.

However, the problem with the RMON2 feature is that it forces a router to bear an extra load when installed in the router as software or increases the manufacturing cost of the router when installed in the form of LSI. Further, when the RMON2 feature is implemented as a monitoring device, the monitoring device should be connected to a network segment to be monitored, increasing a network construction cost.

SUMMARY OF THE INVENTION

It is an object of the present invention to provide a traffic managing method capable of freeing a router from an extra load, reducing the manufacturing cost of a router, and reducing a network construction cost, and also an apparatus for practicing the same.

A traffic managing method of the present invention begins with collecting routing tables and Use columns from routers included in a telecommunications network and storing them router by router. A calculation table is produced for calculating the number of packets sent. It is determined whether or not a subject router has relayed information, on the basis of the next router listed on the above table. If the answer of this decision is positive, a value produced by subtracting the number of packets relayed is used as the number of packets sent between the subject router and the destination network segment. The number of packets is recorded in a router-to-network traffic distribution matrix. All destination network segments belonging to each router are searched for. The values in the rows corresponding to the destination network segments are added to each other to produce a router-to-router traffic distribution matrix.

According to the invention, traffic managing apparatus for calculating traffic at a site in a telecommunications network including routers and network segments interconnected to the routers for transferring information over the network, comprises: a first processing circuit for collecting management data on information transferred from each of the routers; and a second processing circuit for determining the amount of information transferred via the site on the basis of the management data.

BRIEF DESCRIPTION OF THE DRAWINGS

The objects and features of the present invention will become more apparent from consideration of the following detailed description taken in conjunction with the accompanying drawings in which:

FIG. 3 shows a specific routing table and a specific Use column associated therewith;

FIGS. 4 through 7 respectively show specific routing tables including data collected from routers R1 through R4 included in the network shown in FIG. 1;

FIG. 8 is a view useful for understanding the calculation of the number of packets sent unique to the present invention;

FIG. 10 shows a specific topology database stored in a network topology manager included in the illustrative embodiment;

FIG. 11 shows a specific router-network traffic distribution matrix;

FIGS. 12 through 15 respectively show tables for calculating the number of packets sent to network segments Net3 through Net6 included in the network of FIG. 1;

FIG. 16 shows a table for calculating the number of packets sent to a default router RX included in the network of FIG. 1;

FIGS. 17 through 20 respectively show tables for calculating the number of packets sent to network segments Net7, Net8, Net1 and Net2 included in the network of FIG. 1;

FIG. 21 shows a complete, router-network traffic distribution matrix;

FIG. 23 shows a router-router traffic distribution matrix particular to the embodiment of FIG. 22;

FIG. 24 shows a complete, router-router traffic distribution matrix particular to the embodiment of FIG. 22;

FIGS. 27 through 30 respectively show tables listing specific interface statistics relating to the routers R1 through R4;

FIG. 31 shows a table listing interface statistics on a destination network segment basis;

FIG. 32 shows a table listing L3 packet lengths on a destination network segment basis;

FIG. 33 shows a router-network traffic distribution matrix derived from differences in the number of packets; and FIG. 34 shows a table listing a router-network traffic distribution matrix based on frequency band used.

DESCRIPTION OF THE PREFERRED EMBODIMENTS

Figure 1:
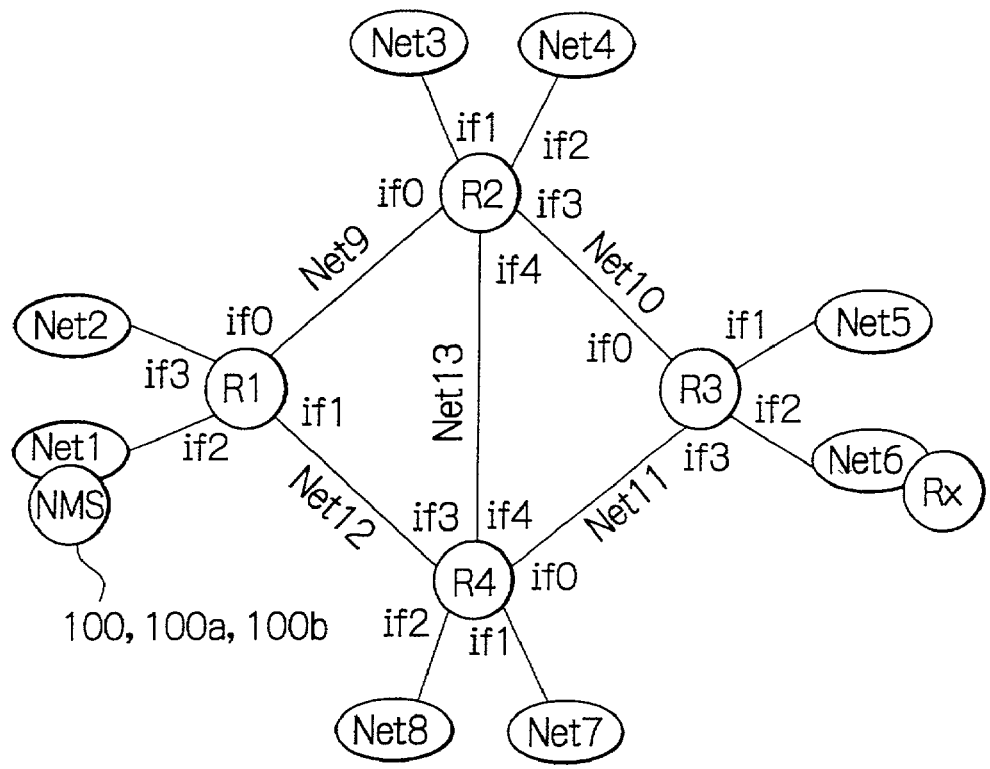
FIG. 1 is a schematic block diagram showing a specific network to which the present invention is applied.

Referring to FIG. 1 of the drawings, a specific telecommunications network to which the present invention is applicable includes an NMS (Network Management System) 100 playing the role of a traffic managing apparatus that manages the traffic of the network. The network is constituted by various kinds of sites or sections, such as routers R1, R2, R3, R4 and RX and network segments Net1 through Net13 in the specific embodiment. The routers R1, R2, R3, R4 and RX are adapted to transfer packets or information over the network. Among them, the router RX is a default router for transferring packets to the outside of the network shown in FIG. 1. As denoted with each of the routers R1 through R4, each router includes network interfaces if0 through if4, some of which may be idle.

In the network shown, each of the network segments Net1 through Net8 includes a terminal and a server, not shown in the figure. The network also includes another network segment Net9 which connects the routers R1 and R2 with each other as well as still another network segment Net 10 which connects the routers R2 and R3 with each other. Likewise, a network segment Net11 connects the routers R3 and R4 with each other while a network segment Net12 connects the routers R1 and R4 with each other. Further, the network includes a network segment Net13 connecting the routers R2 and R4 with each other. In this sense, the network segments Net9 through Net13 are point-to-point network segments.

Figure 2:
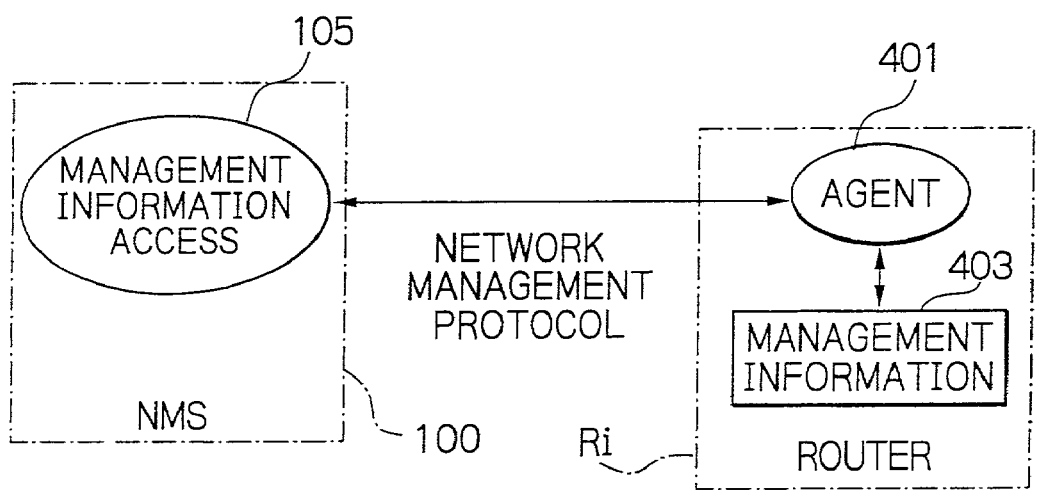
FIG. 2 is a schematic block diagram showing the connection of an NMS and a router.

In the specific network configuration shown in FIG. 1, the NMS 100 is included in the network segment Net1 by way of example. FIG. 2 schematically shows the connection of the NMS 100 and a router Ri, which may be any one of the routers R1 through R4, i.e. i=1, 2, 3 or 4. As shown, the NMS 100 uses a network management protocol to send out a management information collection request to an agent 401, which is included in the router. In response, the agent 401 collects management information 403 particular to the router Ri and sends out it to the NMS 100.

FIG. 3 shows a specific routing table 405 and a specific Use column 407 stored in the individual router Ri. The routing table 405 is generated by a shortest route search scheme. As shown, the routing table 405 includes columns Prot, Destination, Mask, Next Router, Metric and Interface. Prot is representative of the kind of routing, i.e., a network segment C directly connected or information R obtained by a routing protocol. Destination is representative of a destination network segment while Mask is representative of a subnet mask used to determine a destination network segment. Next Router is representative of the address of the next, or downstream with respect to packet flow, router to which the router Ri should send out a packet. Metric is representative of a cost necessary for a packet to reach a destination network segment. Interface is representative of the interface of the router to which the next router is connected. Further, User column 407 lists the total numbers of packets sent via the respective route entries of the routing table 405.

FIGS. 4 through 7 respectively show an example of R1 through R4 routing tables 409 stored in the NMS 100. The R1 through R4 routing tables 409 list the Destinations, Next Routers, IFs (Interface) and Use columns of the routers R1 through R4, respectively.

Figure 9:
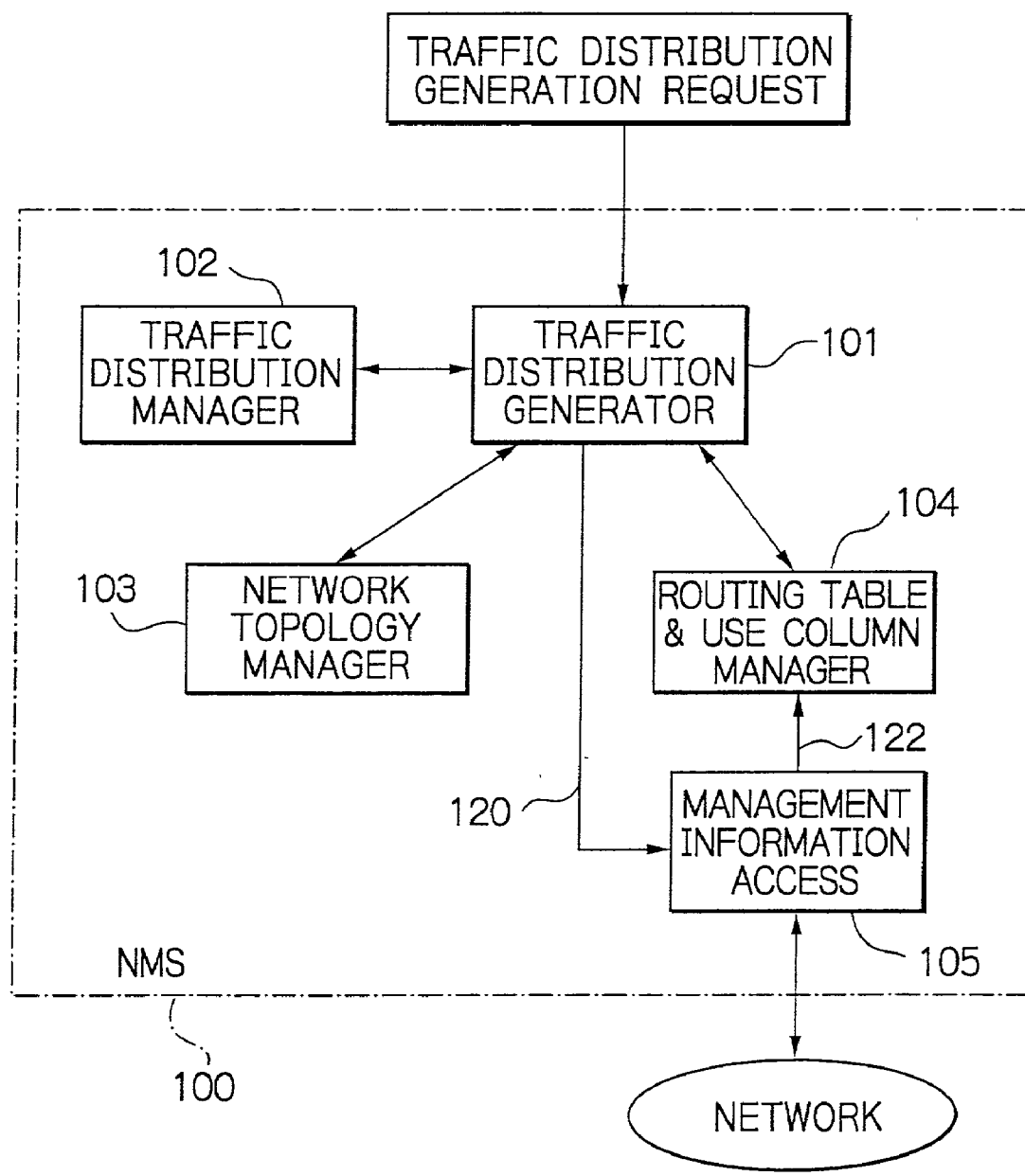
FIG. 9 is a schematic block diagram showing an NMS embodying the present invention.

FIG. 9 shows a specific configuration of the NMS 100 of the illustrative embodiment. As shown, the NMS 100 includes a traffic distribution generator 110. The traffic distribution generator 101 is adapted to calculate, if a traffic distribution generation request is input to the NMS 100 by a network manager managing the network or by periodic polling, the number of packets transmitted between each router and each network segment by using a traffic distribution manager 102 as well as other components of the NMS 100, which will be described specifically later. The traffic distribution manager 102 is adapted to store the calculated numbers of packets in a router-to-network traffic distribution matrix 112, FIG. 11. The NMS 100 includes a network topology manager 103, which is adapted to store a topology database 111, FIG. 10, particular to the network covered by the NMS 100. A routing table and Use column manager 104 is adapted for storing routing tables 409 with the Use columns collected as management information via a management information access 105. The management information access 105 is adapted for making access to the various routers by using the network management protocol to thereby collect management information.

The illustrative embodiment executes traffic management with the NMS 100, as will be described hereinafter. First, reference will be made to FIG. 8 for describing a basic procedure for calculating the traffic distribution of the entire network by using the routing tables 405 and Use columns 407.

Figures 7, 8:
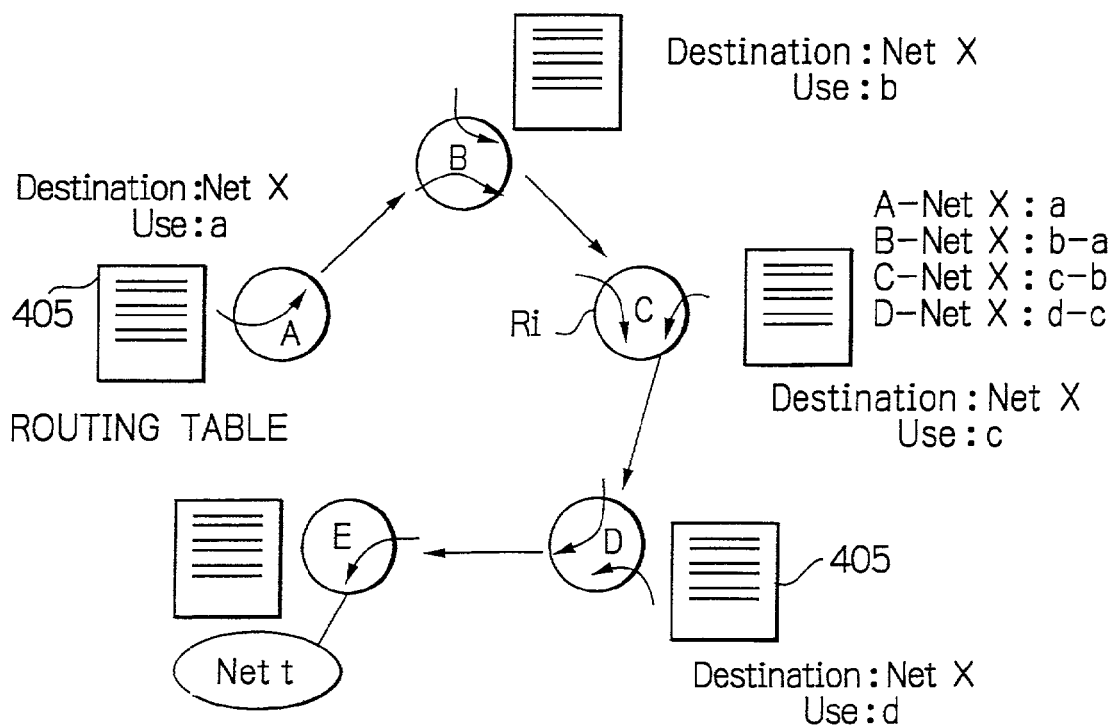

As shown in FIG. 8, assume that a packet transfer route extends from a router A to a network NetX via routers B, C, D and E. Routers A through E may be any of the routers, Ri, shown in FIG. 1. Also, assume that the routers A through E have the routing tables 405 each listing the Destination network NetX, and that the routers A through D have the Use columns 407 listing values a through d, respectively. Then, the value a of the Use column of the router A is simply representative of the number of packets originated and transmitted from the router A to the Destination network NetX because the router A holds no packets to be relayed from an upstream router.

The router B relays the packets received from the router A. Therefore, the number of packets originated and transmitted from the router B to the network NetX is b-a. Likewise, the routers C and D respectively relay packets received from the routers A and B and packets received from the routers A, B and C. Therefore, the numbers of packets originated and transmitted from the routers C and D to the network NetX are c-b and d-c, respectively. It will be described hereinafter how the NMS 100 generates a router-to-network traffic distribution matrix under the above principle.

Referring again to FIG. 9, upon receiving the traffic distribution generation request, the traffic distribution generator 101 feeds a management information collection command 120 to the management information access 105. In response, the management information access 105 sends a collection request to the routers R1 through R4, FIG. 1, in order to collect information listed in their routing tables 405 and Use columns 407. The management information access 105 then receives the management information from the routers R1 through R4 and transfers the information 122 to the routing table and Use column manager 104 with the respective routers R1 through R4 specified.

The traffic distribution generator 101 generates a model of the traffic distribution matrix 112, FIG. 11, on the basis of the topology database 111, FIG. 10, which is stored in the network topology manager 103. The model is written to the traffic distribution manager 102. Subsequently, the traffic distribution generator 101 calculates the number of packets sent from each source router to each destination network segment listed in the router-to-network traffic distribution matrix 112. This will be described specifically in the sequence of the routers R1 through R4.

(1) Packets Sent from R1 to Net3

To calculate the number of packets sent from the router R1 to the network segment Net3, the traffic distribution generator 101 picks up entries whose Destinations are Net3 out of the routing tables 405 and the Use columns 407 stored in the routing table and Use column manager 104. The generator 101 then connects the above entries on the basis of the router to which the individual entry belongs. Subsequently, the generator 101 uses the routers as an index to generate a calculation table 124 shown in FIG. 12.

The destination network segments stored in the topology database 111, FIG. 10, show that packets are transferred to the network segment Net3 from the router R2. In the table 124 shown in FIG. 12, according to the entry whose index is R1, Next Router that has sent packets to the network segment Net3 is the router R2. The generator 101 then searches for an entry whose Next Router is R1. In the specific table 124 of FIG. 12, none of the entries includes the router R1 as Next Router, meaning that the router R1 has not relayed any packet to the network segment Net3. The generator 101 therefore determines that a value c1 listed in the Use column of the entry whose index is R1 shows the number of packets entirely sent from the router R1 to the network segment Net3. The generator 101 writes the number of packets c1 in a frame R1-Net3, i.e. the frame at which the column R1 crosses the row Net3, included in the router-to-network traffic distribution matrix 112, FIG. 11, which is stored in the traffic distribution manager 102.

(2) Packets Sent from R1 to Net4

The topology database 111, FIG. 10, shows that packets are transferred from the router R2 to the network segment Net4 as well as to the network segment Net3. FIG. 13 shows a specific calculation table 124 generated by the generator 101 and relating to the network Net4. The generator 101 performs calculation in the same manner as in the case (1) and determines that the number of packets sent from the router R1 to the network segment Net4 is d1. The generator 101 then writes the number of packets d1 in a frame R1-Net4, i.e. the frame at which the column R1 crosses the row Net4, in the router-to-network traffic matrix 112.

(3) Packets Sent from R1 to Net5

The topology database 111 shows that packets are transferred from the router R3 to the network segment 5. FIG. 14 shows a specific calculation table 124 generated by the generator 101 and relating to the network segment Net5. As shown, in the entry whose index is R1, packets are sent to the network segment Net5 via Next Router R2. Also, in the entry whose index is R2, packets are sent to the network segment Net5 via Next Router R3. The route from the router R1 to the network segment Net5 is therefore from router R1 through routers R2 and R3 to segment Net5. The generator 101 then searches for an entry whose Next Router is R1. In the specific table 124 of FIG. 14, none of the entries includes the router R1 as Next Router, meaning that the router R1 is not used to relay packets to the network segment Net5. The generator 101 therefore determines that a value e1 listed in the Use column of the entry whose index is R1 shows the total number of packets sent from the router R1 to the network segment Net5. The generator 101 writes the value e1 in a frame R1-Net5, i.e. the frame at which the column R1 crosses the row Net5, in the router-to-network traffic matrix 112.

(4) Packets Sent from R1 to Net6

The topology database 111, FIG. 10, shows that packets are transferred from the router R3 to the network segment Net6, and that the segment Net6 is connected to the default router RX because of a symbol "def" specified. It follows that the number of packets sent from the router R1 to the router R6 is the total of the numbers of packets sent to the default router RX. FIG. 15 shows a specific calculation table 124 generated by the generator 101 and relating to the network segment Net6. As FIG. 15 indicates, the generator 101 performs calculation in the same manner as in the case (3) and determines that the number of packets sent from the router R1 to the network segment Net6 is f1.

FIG. 16 shows a specific calculation table 124 generated by the generator 101 and relating to the default router RX. As FIG. 16 indicates, the generator 101 performs calculation in the same manner as with the network segment Net5 and determines that the number of packets sent from the router R1 to the default router RX is i1. Consequently, the number of packets sent from the router R1 to the network segment Net6 is f1+i1. The generator 101 writes the value f1+i1 in a frame R1-Net6, i.e. the frame at which the column R1 crosses the row Net6, included in the router-network traffic distribution matrix 112.

(5) Packets Sent from R1 to Net7

The topology database 111 shows that packets are transferred from the router R4 to the network segment Net7. FIG. 17 shows a specific calculation table 124 generated by the traffic distribution generator 101 and relating to the network segment Net7. As shown, according to an entry whose index is R1, Next Router having sent packets to the network segment Net7 is R4. The generator 101 then searches for an entry whose Next Router is R1. In the specific table 124 of FIG. 17, none of the entries includes the router R1 as Next Router, meaning that the router R1 is not included in the transit route to the network segment Net7. It follows that a value g1 listed in the Use column of the entry whose index is R1 represents the total number of packets sent from the router R1 to the network segment Net7. The generator 101 writes the value g1 in an R1-Net7 frame included in the router-network traffic distribution matrix 112.

(6) Packets Sent from R1 to Net8

The topology database 111 shows that packets are transferred from the router R4 to the network segment Net8. FIG. 18 shows a specific calculation table 124 generated by the generator 101 and relating to the network segment Net8. As shown, the generator 101 performs calculation in the same manner as in the case (5). The number of packets sent from the router R1 to the network segment Net8 is h1. The generator 101 writes the value h1 in a frame R1-Net8, i.e. the frame at which the column R1 crosses the row Net8, included in the router-network traffic distribution matrix 112.

(7) Packets Sent from R2 to Net1

The topology database 111 shows that packets are transferred from the router R1 to the network segment Net1. FIG. 19 shows a specific calculation table 124 generated by the generator 101 and relating to the network segment Net1. As shown, in an entry whose index is R2, Next Router having sent packets to the network segment Net1 is R1. The generator 101 then searches for an entry whose Next Router is R2. In the specific table 124 of FIG. 19, none of the entries includes the router R2 as Next Router, meaning that the router R2 is not used to relay packets to the network segment Net1. Therefore, a value a2 listed in the Use column of the entry whose index is R1 represents the total number of packets sent from the router R2 to the network segment Net1. The generator 101 writes the value a2 in a frame R2-Net1, i.e. the frame at which the column R2 crosses the row Net1, included the router-network traffic distribution table 112.

(8) Packets Sent from R2 to Net2

The topology database 111 shows that packets are transferred from the router R1 to the network segment Net2 as well as to the network segment Net1. FIG. 20 shows a specific calculation table 124 generated by the generator 101 and relating to the network segment Net2. As FIG. 20 indicates, the generator 101 performs calculation in the same manner as in the case (7). The number of packets sent from the router R2 to the network segment Net2 is b2. The generator writes the value b2 in a frame R2-Net2, i.e. the frame at which the column R2 crosses the row Net2, included in the router-network traffic distribution matrix 112.

(9) Packets Sent from R2 to Net5

The topology database 111 shows that packets are transferred from the router R3 to the network segment Net5. FIG. 14 shows the calculation table 124 generated by the generator 101 and relating to the network segment Net5. As shown, in an entry whose index is R2, Next router having sent packets to the network segment Net5 is R3. The generator 101 then searches for an entry whose Next Router is R2, and finds out the entry whose Next Router is R1. In the table of FIG. 14, none of the entries includes the router R1 as Next Router, meaning that the router R2 is included in the transit route to the network Net5. The transit route to the network is therefore from the router R1 via the routers R2 and R3 to the segment Net5. It follows that the number of packets sent from the router R2 to the network segment Net5 include the packets sent from the router R1 to the network segment Net5. Therefore, the number of packets sent from the router R2 to the network Net5 is e2-e1. The generator 101 writes the value e2-e1 in a frame R2-Net5, i.e. the frame at which the column R2 crosses the row Net5, in the router-network traffic distribution matrix 112.

(10) Packets Sent from R2 to Net6

The topology database 111 shows that packets are transferred from the router R3 to the network segment Net6, and that the segment Net6 is connected to the default router RX because of a symbol "def". Therefore, the number of packets sent from the router R2 to the network segment Net6 is the sum of the number of packets sent from the router R2 to the network segment Net6 and the number of packets sent from the router R2 to the default router RX. FIG. 15 shows the calculation table 124 generated by the generator 101 and relating to the network segment Net6.

The generator 101 performs calculation in the same manner as in the case (9). Specifically, the number of packets sent from the router R2 to the network segment Net6 is f2-f1. FIG. 16 shows the calculation table 124 generated by the generator 101 and relating to the default router RX. As shown, the number of packets sent from the router R2 to the default router RX is i2-i1. It follows that the number of packets sent from the router R2 to the network segment Net6 is f2-f1+i2-i1. The generator 101 writes the value f2-f1+i2-i1 in a frame R2-Net6, i.e. the frame at which the column R2 crosses the row Net6, included in the router-network traffic distribution matrix 112.

(11) Packets Sent from R2 to Net7

The topology database 111 shows that packets are transferred from the router R4 to the network segment Net7. FIG. 17 shows the calculation table 124 generated by the generator 101 and relating to the network segment Net7. As shown, in an entry whose index is R2, Next Router having sent packets to the network segment Net7 is R4. The generator 101 then searches for an entry of which Next Router is R2. In the table 124 of FIG. 17, none of the entries includes the router R2 as Next Router, meaning that the router R2 is not included in the transit route to the network segment Net7. It follows that a value g2 listed in the Use column whose index is R2 is representative of the total number of packets sent from the router R2 to the network segment Net2. The generator 101 writes the value g2 in a frame R2-Net7, i.e. the frame at which the column R2 crosses the row Net7, included in the router-network traffic distribution matrix 112.

(12) Packets Sent from R2 to Net8

The topology database 111 shows that packets are transferred from the router R4 to the network segment Net8 as well as to the network segment Net7. FIG. 18 shows the calculation table 124 generated by the generator 101 and relating to the network Net8. As shown, the generator 101 performs calculation in the same manner as in the case (11). The number of packets sent from the router R2 to the network segment Net8 is h2. The generator 101 writes the value h2 in a frame R2-Net8, i.e. the frame at which the column R2 crosses the row Net8, included in the router-network traffic distribution matrix 112.

(13) Packets Sent from R3 to Net1

The topology database 111 shows that packets are sent from the router R1 to the network segment Net1. FIG. 19 shows the calculation table 124 generated by the generator 101 and relating to the network segment Net1. As shown, in an entry whose index is R3, Next Router having sent packets to the network segment Net1 is R4. The generator 101 then searches for an entry whose Next Router is R3. In the table of FIG. 19, none of the entries includes the router R3 as Next Router, meaning that the router R3 is not included in the transit route to the network segment Net1. It follows that a value a3 listed in the Use column of the entry whose index is R3 is representative of the total number of packets sent from the router R3 to the network segment Net1. The generator 101 writes the value a3 in a frame R3-Net1, i.e. the frame at which the column R3 crosses the row Net1, included in the router-network traffic distribution matrix 112.

(14) Packets Sent from R3 to Net2

The topology database 111 shows that packets are sent from the router R1 to the network segment Net2 as well as to the network segment Net1. FIG. 20 shows the calculation table 124 generated by the generator 101 and relating to the network segment Net2. As shown, the generator 101 performs calculation in the same manner as in the case (13). The number of packets sent from the router R3 to the network segment Net2 is b3. The generator 101 writes the value b3 in a frame R3-Net2, i.e. the frame at which the column R3 crosses the row Net2, included in the router-network traffic distribution matrix 112.

(15) Packets Sent from R3 to Net3

The topology database 111 shows that packets are sent from the router R2 to the network segment Net3. FIG. 12 shows the calculation table 124 generated by the generator 101 and relating to the network segment Net3. As shown, in an entry whose index is R3, Next Router having sent packets to the network segment Net3 is R2. The generator 101 then searches for an entry whose Next Router is R3. In the table of FIG. 12, none of the entries includes the router R3 as Next Router, meaning that the router R3 is not included in the transit route to the network segment Net3. It follows that a value c3 listed in the Use column of the entry whose index is R3 is representative of the total number of packets sent from the router R3 to the network segment Net3. The generator 101 writes the value c3 in a frame R3-Net3, i.e. the frame at which the column R3 crosses the row Net3, included in the router-network traffic distribution matrix 112.

(16) Packets Sent from R3 to Net4

The topology database 111 shows that packets are sent from the router R2 to the network segment Net4 as well as to the network segment Net3. FIG. 13 shows the calculation table 124 generated by the generator 101 and relating to the network segment Net4. As shown, the generator 101 performs calculation in the same manner as in the case (15). The number of packets sent from the router R3 to the network segment Net4 is d3. The generator 101 writes the value d3 in a frame R3-Net4, i.e. the frame at which the column R3 crosses the row Net4, included in the router-network traffic distribution matrix 112.

(17) Packets Sent from R3 to Net7

The topology database 111 shows that packets are sent from the router R4 to the network segment Net7. FIG. 17 shows the calculation table 124 generated by the generator 101 and relating to the network segment Net7. As shown, in an entry whose index is R3, Next Router having sent packets to the network segment Net7 is R4. The generator 101 then searches for an entry whose Next Router is R3. In the table 124 of FIG. 17, none of the entries includes the router R3 as Next Router, meaning that the router R3 is not included in the transit route to the network segment Net7. It follows that a value g3 listed in the Use column of the entry whose index is R3 is representative of the total number of packets sent from the router R3 to the network segment Net7. The generator 101 writes the value g3 in a frame R3-Net7, i.e. the frame at which the column R3 crosses the row Net7, included in the router-network traffic distribution matrix 112.

(18) Packets Sent from R3 to Net8

The topology database 111 shows that packets are sent from the router R4 to the network segment Net8 as well as to the network segment Net7. FIG. 18 shows the calculation table 124 generated by the generator 101 and relating to the network segment Net8. As shown, the generator 101 performs calculation in the same manner as in the case (17). The number of packets sent from the router R3 to the network segment Net8 is h3. The generator 101 writes the value h3 in a frame R3-Net8, i.e. the frame at which the column R3 crosses the row Net8, included in the router-network traffic distribution matrix 112.

(19) Packets Sent from R4 to Net1

The topology database 111 shows that packets are sent from the router R1 to the network segment Net1. FIG. 19 shows the packet calculation table 124 generated by the generator 101 and relating to the network segment Net1. As shown, in an entry whose index is R4, Next Router having sent packets to the network segment Net1 is R1. The generator 101 then searches for an entry whose Next Router is R4, and finds out an entry whose index is R3. Further, the generator 101 searches for an entry whose Next Router is R3. In the table 124 of FIG. 19, none of the entries includes the router R3 as Next Router, meaning that the router R4 is included in the transit route to the network segment Net1. The transit route is therefore the router R3 via the routers R4 and R1 to the segment Net1. It follows that the number of packets sent from the router R4 to the network segment Net1 includes the number of packets sent from the router R3 to the network segment Net1. The number of packets sent from the router R4 to the network segment Net1 is therefore a4-a3. The generator 101 writes the value a4-a3 in a frame R4-Net1, i.e. the frame at which the column R4 crosses the row Net1, included in the router-network traffic distribution matrix 112.

(20) Packets Sent from R4 to Net2

The topology database 111 shows that packets are sent from the router R1 to the network segment Net2 as well as to the network segment Net1. FIG. 20 shows the calculation table 124 generated by the generator 101 and relating to the network segment Net2. As shown, the generator 101 performs calculation in the same manner as in the case (19). The number of packets sent from the router R4 to the network segment Net2 is b4-b3. The generator 101 writes the value b4-b3 in a frame R4-Net2, i.e. the frame at which the column R4 crosses the row Net2, included in the router-network traffic distribution matrix 112.

(21) Packets Sent from R4 to Net3

The topology database 111 shows that packets are sent from the router R2 to the network segment Net3. FIG. 12 shows the calculation table 124 generated by the generator 101 and relating to the network segment Net3. As shown, in an entry having its index R4 recorded, Next Router having sent packets to the network segment Net3 is R2. The generator 101 then searches for an entry whose Next Router is R4. In the table 124 of FIG. 12, none of the entries includes the router R4 as Next Router, meaning that the router R4 is not included in the transit route to the network segment Net3. It follows that a value c4 listed in the Use column of the entry whose index is R4 is representative of the total number of packets sent from the router R4 to the network segment Net3. The generator 101 writes the value c4 in a frame R4-Net3, i.e. the frame at which the column R4 crosses the row Net3, included in the router-network traffic distribution matrix 112.

(22) Packets Sent from R4 to Net4

The topology database 111 shows that packets are sent from the router R2 to the network segment Net4 as well as to the network segment Net3. FIG. 13 shows the calculation table 124 generated by the generator 101 and relating to the network segment Net4. As shown, the generator 101 performs calculation in the same manner as in the case (21). The number of packets sent from the router R4 to the network segment Net4 is d4. The generator 101 writes the value d4 in a frame R4-Net4, i.e. the frame at which the column R4 crosses the row Net4, included in the router-network traffic distribution matrix 112.

(23) Packets Sent from R4 to Net5

The topology database 111 shows that packets are sent from the router R3 to the network segment Net5. FIG. 14 shows the calculation table 124 generated by the generator 101 and relating to the network segment Net5. As shown, in an entry whose index is R4, Next Router having sent packets to the network segment Net5 is R3. The generator 101 then searches for an entry whose Next Router is R4. In the table 124 of FIG. 14, none of the entries includes the router R4 as Next Router, meaning that the router R4 is not included in the transit route to the network segment Net5. It follows that a value e4 listed in the Use column of the entry whose index is R4 is representative of the total number of packets sent from the router R4 to the network segment Net5. The generator 101 writes the value e4 in a frame R4-Net5, i.e. the frame at which the column R4 crosses the row Net5, included in the router-network traffic distribution matrix 112.

(24) Packets Sent from R4 to Net6

The topology database 111 shows that packets are sent from the router R3 to the network segment Net6, and that the network segment Net6 is connected to the default network RX because of the symbol "def". Therefore, the number of packets sent from the router R4 to the network segment Net6 includes the number of packets sent to the default router RX. FIG. 15 shows the calculation table 124 generated by the generator 101 and relating only to the network segment Net6. The generator performs calculation in the same manner as in the case (23). As FIG. 15 indicates, the number of packets sent from the router R4 to the network segment Net6 is f4.

FIG. 16 shows the calculation table 124 generated by the generator 101 and relating to the default router RX. The generator 101 performs calculation in the same manner as in the case (23). As FIG. 16 indicates, the number of packets sent from the router R4 to the network segment Net6 is f4+i4. The generator 101 writes the value f4+i4 in a frame R4-Net6, i.e. the frame at which the column R4 crosses the row Net6, included in the router-network traffic distribution matrix 112.

Well, FIG. 21 shows a complete, router-to-network traffic matrix 113 listing all of the numbers of transmitted packets calculated by the procedure described above. In the illustrative embodiment, the traffic distribution manager 102 always stores two traffic distribution matrices 113 inclusive of one established immediately preceding, or upstream with respect to packet flow from, the current matrix 113.

As stated above, the illustrative embodiment can grasp the behavior of the traffic of the entire network on the basis of the router-to-network traffic distribution matrix 113 that lists the numbers of packets sent. Also, the illustrative embodiment can manage the traffic without relying on the performance or the function of the individual router because it generates a traffic distribution by using routing tables 405 essential with routers Ri. Further, the illustrative embodiment frees the individual router Ri from an extra load because it is practicable without installing software for packet filtering in each router. Moreover, the illustrative embodiment does not need a monitoring device otherwise included in a network for the purpose of filtering packets and therefore does not increase the network construction cost.

Figure 22:
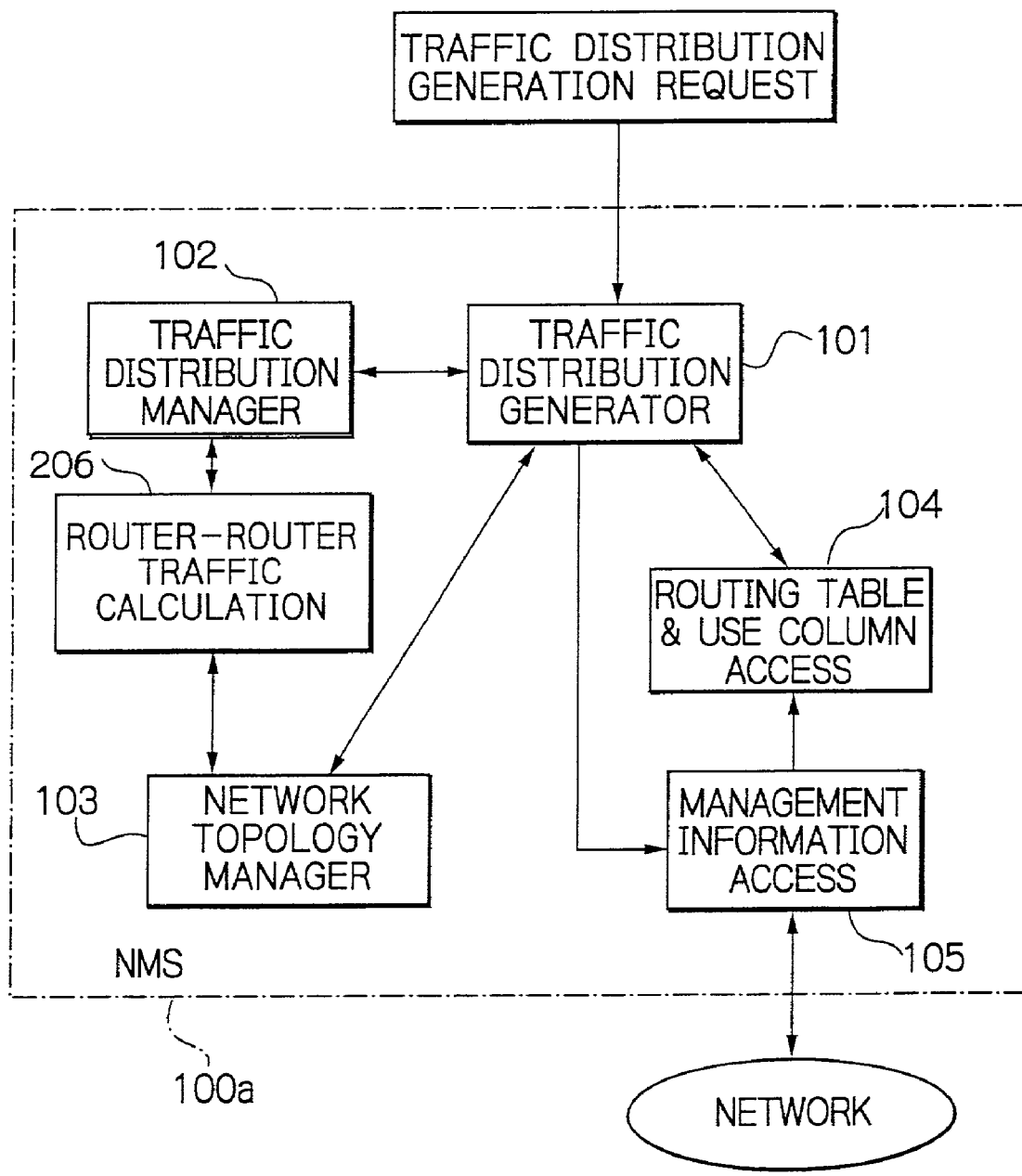
FIG. 22 is a schematic block diagram, similar to FIG. 9, showing an NMS in accordance with an alternative embodiment of the present invention.

Reference will be made to FIG. 22 for describing an NMS 100a according to an alternative embodiment of the present invention. As shown, the NMS 100a includes a router-network traffic calculator 206 in addition to the traffic distribution generator 101, the traffic distribution manager, 102, the network topology manager 103, the routing table and Use column manager 104 and the management information access 105. The like components are designated with the same reference numerals, and will not be described specifically in order to avoid redundancy.

The router-router traffic calculator 206 is connected to the traffic distribution manager 102 and network topology manager 103. The router-router traffic calculator 206 is adapted to calculate the numbers of packets sent. The traffic distribution manager 102 stores the numbers of sent packets thus calculated in a router-to-router traffic distribution matrix 211, FIG. 23.

A traffic managing method unique to the illustrative embodiment will be described hereinafter with reference to the specific network of FIG. 1. The traffic distribution manager 102 delivers the complete, router-to-network traffic distribution matrix 113, FIG. 21, to the router-router traffic calculator 206. The router-router traffic calculator 206 reads the topology database 111, FIG. 10, in the network topology manager 103. It will be described hereinafter how the router-router traffic calculator 206 calculates the numbers of sent packets.

By referencing the specific topology database 111, FIG. 10, the router-router traffic calculator 206 determines that packets transmitted from the router R1 are directed to the network segments Net1 and Net2. The calculator 206 therefore adds data stored in the rows Net1 and Net2 of the router-network traffic distribution matrix 113 to each other router by router. The calculator 206 then records the resulting sums, i.e. the number of sent packets, in frames R1-R2, R1-R3 and R1-R4, representing destination-source routers, of the router-to-router traffic matrix 211, FIG. 23.

Likewise, by referencing the topology database 111, the router-router traffic calculator 206 determines that the router R2 has transferred packets to the network segments Net3 and Net4. The calculator 206 therefore adds data in the rows of Net3 and Net4 of the router-network traffic distribution matrix 113 to each other router by router. The calculator 206 then writes the resulting sums in frames R2-R1, R2-R3 and R2-R4 included in the matrix 211 as the number of sent packets.

Further, by referencing the topology database 111, the router-router traffic calculator 206 determines that the router R3 has transferred packets to the network segments Net5 and Net6. The calculator 206 therefore adds data in the rows of Net5 and Net6 of the router-network traffic distribution matrix 113 to each other router by router. The calculator 206 then writes the resulting sums in frames R3-R1, R3-R2 and R3-R4 included in the matrix 211 as the number of sent packets.

In addition, by referencing the topology database 111, the router-router traffic calculator 206 determines that the router R4 has transferred packets to the network segments Net7 and Net8. The calculator 206 therefore adds data in the rows of Net7 and Net8 of the router-to-network traffic distribution matrix 113 to each other router by router. The calculator 206 then writes the resulting sums in frames R4-R1, R4-R2 and R4-R3 included in the matrix 211 as the number of sent packets.

FIG. 24 shows the completed, router-to-router traffic distribution matrix 211 filled up with the numbers of sent packets calculated by the above-described procedure. Again, it is noted that the traffic distribution manager 102 always stores two consecutive router-to-router traffic distribution matrices inclusive of immediately preceding one.

As stated above, the illustrative embodiment collectively manages traffic sharing the same route among the routers and thereby provides a layered traffic distribution.

Figures 25, 26:
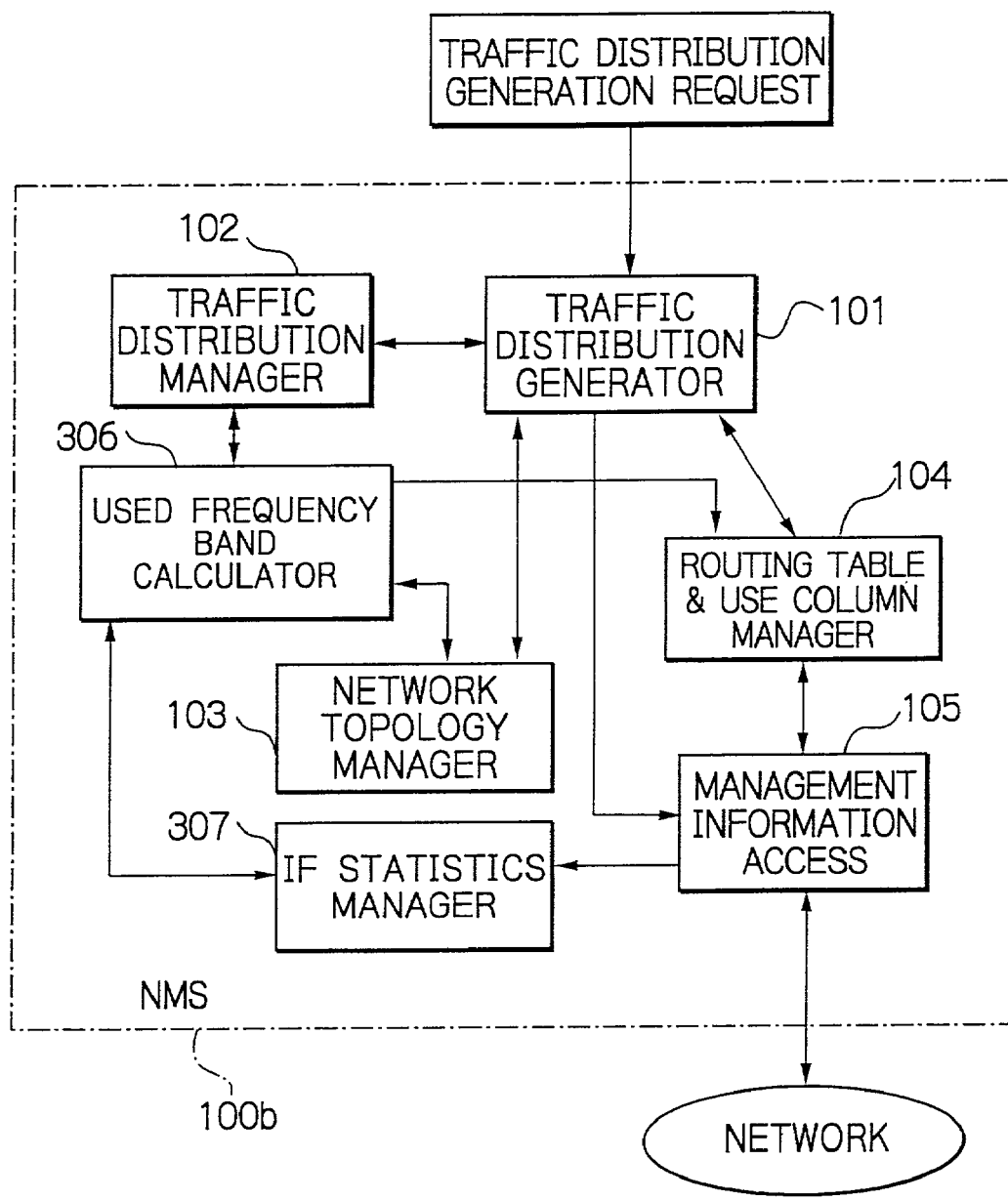
FIG. 25 is a schematic block diagram, similar to FIG. 9, showing an NMS in accordance with another alternative embodiment of the present invention.
FIG. 26 shows a table listing specific interface statistics to be dealt with by the embodiment of FIG. 25.

FIG. 25 shows an NMS 100b in accordance with another alternative embodiment of the present invention. As shown, the NMS 100b includes a used frequency band calculator 306 and an IF (interface) statistics manager 307 in addition to the traffic distribution generator 101, the traffic distribution manager 102, the network topology manager 103, the routing table and Use column manager 104, and the management information access 105.

The used frequency band calculator 306 is connected to the traffic distribution manager 102, IF statistics manager 307, routing table and Use column manger 104, and network topology manager 103 as illustrated in the figure. Further, the IF statistics manager 307 is connected to the management information access 105.

FIG. 26 shows a table 309 listing specific interface statistics, which form part of the management data particular to the individual router Ri. As shown, the table 309 includes a column Interface indicative of an interface to which Next Router is connected, a column ifOutPkts indicative of the total number of packets sent from an interface, and a column ifOutOctets indicative of the total number of octets sent from an interface and including a frame header.

A traffic managing method available with the illustrative embodiment will be described hereinafter with reference to the specific network shown FIG. 1. If the NMS 100b has received a traffic distribution generation request input by a network manager or by periodic polling, then the traffic distribution generator 101 delivers a management information collection command to the management information access 105. In response, the management information access 105 sends out a collection request to the routers on the network in order to collect interface statistics. The management information access 105 writes management information received from the routers in the IF statistics manager 307 while distinguishing the routers from each other.

The traffic distribution manager 102 delivers the router-to-router or the router-to-network traffic distribution matrix completed to the used frequency band calculator 306. In response, the used frequency band calculator 306 reads the topology database 111 in the network topology manager 103 and then searches for routers connected to the destination network segments. The results of search are as follows in the specific example:

[Net1:R1, Net2:R1]
[Net3:R2, Net4:R2]
[Net5:R3, Net6:R3]
[Net7:R4, Net8:R4]

Further, the used frequency band calculator 306 sequentially reads the routing tables of the subject routers in the routing table and Use column manager 104 in order to search for interfaces between the routers and the destination network segments. The specific results of search are as follows:

[Net1:R1:if2, Net2:R1:if3]
[Net3:R2:if2, Net4:R2:if2]
[Net5:R3:if1, Net6,R3:if2]
[Net7:R4:if1, Net8:R4:if2]

The used frequency band calculator 306 sequentially searches the router-by-router interface statistics stored in the IF statistics manager 307 on the basis of the above indicated combinations to thereby prepare interface statistics on a destination network segment basis. This procedure to be executed by the calculator 306 will be described more specifically hereinafter.

As for the combination [Net1:R1:if2, Net2:R1:if3], FIG. 27 shows a table 311 listing interface statistics particular to the router R1 and including columns Interface, ifOutPkts and ifOutOctets. For the network segment Net1, the calculator 306 selects n1 and x1 corresponding to the interface, i.e. row if2 out of the columns ifOutPkts and ifOutOctets, respectively. Likewise, for the network segment Net2, the calculator 306 selects o1 and y1 corresponding to the interface if3 out of the columns ifOutPkts and ifOutOctets, respectively.

As for the combination [Net3:R2:if1, Net4:R2:if2], FIG. 28 shows a table 312 listing interface statistics particular to the router R2 and also including columns Interface, ifOutPkts and ifOutOctets. For the network segment Net3, the calculator 306 selects m2 and w2 corresponding to the interface if1 out of the columns ifOutPkts and ifOutOctets, respectively. Likewise, for the network segment Net4, the calculator 306 selects n2 and x2 corresponding to the interface if2 out of the columns ifOutPkts and ifOutOctets, respectively.

As for the combination [Net5:R3:if1, Net6:R3:if2], FIG. 29 shows a table 313 listing interface statistics particular to the router R3 and also including columns Interface, ifOutPkts and ifOutOctets. For the network segment Net5, the calculator 306 selects m3 and w3 corresponding to the interface if1 out of the columns ifOutPkts and ifOutOctets, respectively. Likewise, for the network segment Net4, the calculator 306 selects n3 and x3 corresponding to the interface if2 out of the columns ifOutPkts and ifOutOctets, respectively.

Further, as for the combination [Net7:R4:if1, Net8:R4:if2], FIG. 30 shows a table 314 listing interface statistics particular to the router R4 and also including columns Interface, ifOutPkts and ifOutOctets. For the network segment Net7, the calculator 306 selects m4 and w4 corresponding to the interface if1 out of the columns ifOutPkts and ifOutOctets, respectively. Likewise, for the network segment Net8, the calculator 306 selects n4 and x4 corresponding to the interface if2 out of the columns ifOutPkts and ifOutOctets, respectively.

FIG. 31 shows a table 315 listing the interface statistics and completed by the above procedure on a destination network segment basis. The interface statistics manager 307 always stores two sets of consecutive statistics including immediately preceding one.

Subsequently, the calculator 306 uses the information listed in the table of FIG. 31 to calculate a mean length of L3 packets for each destination network segment. For the calculation, the calculator 306 uses an expression:

$$(\text{ifOutOctets}' - \text{ifOutOctets}) / (\text{ifOutPkts}' - \text{ifOutPkts}) - hd$$

where ifOutOctets' denotes the last total number of octets, ifOutOctets denotes the latest total number of octets, ifOutPkts' denotes the last total number of packets, ifOutPkts denotes the latest total number of packets, and hd denotes the number of octets of a frame header.

FIG. 32 shows a table 812 listing mean L3 packet lengths derived from the above expression for particular destination network segments.

Thereafter, the calculator 306 reads out two router-network traffic distribution matrices based on the number of packets from the traffic distribution manager 102 and then produces differences between them. More specifically, the calculator 306 produces differences between corresponding frames included in the two matrices to thereby generate a traffic distribution matrix based on the differences in the number of packets. FIG. 33 shows a router-to-network traffic distribution matrix 813 based on the difference in the number of packets. By multiplying the values of the traffic distribution matrix 813 by corresponding ones of the mean L3 packet lengths 812, the calculator 306 determines frequency bands used.

FIG. 34 shows a router-to-network traffic distribution matrix 814 completed by the above procedure on the basis of the frequency band used.

As stated above, the illustrative embodiment allows a network manager to survey the entire network by referencing the traffic distribution matrix based on the frequency band used and grasp the routes that might degrade the performance of the network.

While the illustrative embodiments shown and described have concentrated on the number of packets, the number of packets will be replaced with any other feature values suitable for calculating the amount of communication when applied to a different type of telecommunications system.

In summary, it will be seen that the traffic managing method and apparatus of the present invention achieve various unprecedented advantages, as enumerated below.

(1) Traffic management is executed by using management information stored in the individual router. The management can therefore be executed with a minimum of cost without causing the individual router to bear an extra load.

(2) When a certain router is relaying information sent from a router preceding it, the information of the preceding router is subtracted from the information of the relaying router to thereby determine an amount of communication between the transit router and each destination network segment. It is therefore possible to grasp the behavior of the entire network with a minimum of cost without relying upon the performance or the function of each router or casing an extra load on each router.

(3) A router-to-network traffic distribution matrix allows the behavior or the entire network to be grasped. The above advantage (2) is also achievable because software or a monitoring device for filtering packets is not necessary.

(4) Even traffic between routers can be managed. More specifically, by collecting managing traffic sharing the same route between routers, it is possible to produce a layered traffic distribution.

(5) A router-network traffic distribution based on a frequency band used is attainable. This allows a network manager to survey the entire network and find out routes that might degrade the performance of the network.

The entire disclosure of Japanese patent application No. 2001-29097 filed on Feb. 6, 2001, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method of managing traffic by determining numbers of packets transferred via a site in a telecommunications network including routers and network segments interconnected to the routers for transferring packets over the network, comprising the steps of:

holding routing tables including an indication of a next router to which a packet is to be transmitted next and Use columns associated with the routing tables at the routers;

collecting the routing tables and the Use columns from the routers and storing the routing tables and the Use columns collected in connection with the routers;

storing information on connections between subject ones of the routers to be managed and connections between the subject routers and subject ones of the network segments to be managed in a topology database;

rearranging the Use columns collected with respect to a destination network segment of the network segments, and indexing the routers to which the Use columns belong to form a calculation table for calculating a number of first packets sent together with the indication of next routers associated with the Use columns;

preparing a model of router-to-network traffic distribution matrix based on the topology database;

determining, based on the indication of next routers listed on the calculation table, whether or not the subject router has relayed a packet sent from preceding one of the routers which is upstream the subject router;

using, if the subject router has not relayed a packet, a value in the Use column of the subject router as a number of second packets sent between the subject router and the destination network segment, or subtracting, if the subject router has relayed a packet, a value in the Use column of the preceding router from a value in the Use column of the subject router to use a resultant value as the number of packets; and modifying the model of router-to-network traffic distribution matrix with the number of the second packets calculated to form a first router-to-network traffic distribution matrix; and managing traffic with the model of router-to-network traffic distribution matrix at a traffic distribution manager.

2. The method in accordance with claim 1, wherein the first router-to-network traffic distribution matrix has a row of a destination network segment, further comprising the steps of:

preparing a model of router-to-router traffic distribution matrix based on the topology database;

searching, by referencing the topology database, for one of the routers which is directly connected to the destination network segment;

selecting destination network segments belonging to the router searched for in the first router-to-network traffic distribution matrix, and adding values in the rows corresponding to the destination network segments selected to each other to thereby calculate a number of packets transmitted between the router searched for and a source router; and modifying the model of router-to-router traffic distribution matrix with the number of packets calculated to form a router-to-router traffic distribution matrix.

3. The method in accordance with claim 1, further comprising the steps of:

preparing first interface statistics including a number of packets transmitted at the routers;

collecting the first interface statistics from the routers;

searching, by referencing the topology database, for one of the routers which is directly connected to the destination network segment, and searching the routing table of the router searched for to locate an interface between the router and the destination network segment;

searching for the first interface statistics for the routers in respect of a combination of a network, a router and an interface to generate second interface statistics for the destination network segment;

holding current and immediately preceding ones of the second interface statistics;

using the current and immediately preceding second interface statistics to calculate a mean length of the packets for the destination network segment;

obtaining a difference in a number of packets between current and immediately preceding ones of the first router-to-network traffic distribution matrices to form a second router-to-network traffic distribution matrix; and multiplying values in the second router-to-network traffic distribution matrix by the mean length of the packets for the destination network segment corresponding to the second router-to-network traffic distribution matrix to form a third router-to-network traffic distribution matrix based on a used frequency band.

4. The method in accordance with claim 3, wherein the mean length of the packets is calculated as a mean length of L3 packets.

5. A traffic managing apparatus for determining numbers of packets transferred via a site in a telecommunications network including routers and network segments interconnected to the routers for transferring packets over the network, comprising:
- a management information access circuit for collecting routing tables held at the routers and Use columns associated with the routing tables and held at the routers, the routing tables including an indication of a next router to which a packet is to be transmitted next;
- a routing table and Used column manager for storing the routing tables and the Use columns collected in connection with the routers;
- a network topology manager for storing information on connections between subject ones of the routers to be managed and connections between the subject routers and subject ones of the network segments to be managed to form a topology database; and
- a traffic distribution manager for preparing a model of router-to-network traffic distribution matrix based on the topology database, rearranging the Use columns stored with respect to a destination network segment of the network segments, and indexing the routers to which the Use columns belong to form a calculation table for calculating a number of packets sent together with the indication of next routers associated with the Use columns, determining, based on the indication of next routers listed on the calculation table, whether or not the subject router has relayed a packet sent from preceding one of the routers which is upstream the subject router, using, if the subject router has not relayed a packet, a value in the Use column of the subject router as a number of packets sent between the subject router and the destination network segment, or subtracting, if the subject router has relayed a packet, a value in the Use column of the preceding router from a value in the Use column of the subject router to use a resultant value as the number of packets, modifying the model of router-to-network traffic distribution matrix with the number of packets calculated to form a first router-to-network traffic distribution matrix, and managing traffic with the model of router-to-network traffic distribution matrix.

6. The apparatus in accordance with claim 5, wherein the first router-to-network traffic distribution matrix has a row of a destination network segment, further comprising a router-router traffic calculator for preparing a model of router-to-router traffic distribution matrix based on the topology database, referencing the topology database to search for one of the routers which is directly connected to the destination network segment, selecting destination network segments belonging to the router searched for in the first router-to-network traffic distribution matrix, adding values in the rows corresponding to the destination network segments selected to each other to thereby calculate a number of packets transmitted between the router searched for and a source router, and modifying the model of router-to-router traffic distribution matrix with the number of packets calculated to form a router-to-router traffic distribution matrix.

7. The apparatus in accordance with claim 5, further comprising:
- an interface statistics manager for causing said management information access circuit to collect first interface statistics from the routers, the first interface statistics including a number of packets transmitted at the routers; and
- a used frequency band calculator for referencing the topology database to search for one of the routers which is directly connected to the destination network segment, searching the routing table of the router searched for to locate an interface between the router and the destination network segment, searching for the first interface statistics for the routers in respect of a combination of a network, a router and an interface resultant from a located interface to generate second interface statistics for the destination network segment, calculating a mean length of the packets for the destination network segment on a basis of current and immediately preceding ones of the second interface statistics, obtaining a difference in a number of packets between current and immediately preceding ones of the first router-to-network traffic distribution matrices to form a second router-to-network traffic distribution matrix, and multiplying values in the second router-to-network traffic distribution matrix by the mean length of the packets for the destination network segment corresponding to the second router-to-network traffic distribution matrix to form a third router-to-network traffic distribution matrix based on a used frequency band.

8. The apparatus in accordance with claim 7, wherein the mean length of the packets is calculated as a mean length of L3 packets.

9. A telecommunications network comprising:
- a plurality of routers for transferring packets over said network, and network segments interconnected to said plurality of routers, said plurality of routers holding routing tables and Use columns associated with the routing tables, the routing tables including an indication of a next router to which a packet is to be transmitted next; and
- traffic managing apparatus for determining numbers of packets transferred via a site in said network;
- said apparatus comprising:
- a management information access circuit for collecting the routing tables and the Use columns held at the routers;
- a routing table and Used column manager for storing the routing tables and the Use columns collected in connection with the routers;
- a network topology manager for storing information on connections between subject ones of the routers to be managed and connections between the subject routers and subject ones of the network segments to be managed to form a topology database; and
- a traffic distribution manager for preparing a model of router-to-network traffic distribution matrix based on the topology database, rearranging the Use columns stored with respect to a destination network segment of the network segments, and indexing the routers to which the Use columns belong to form a calculation table for calculating a number of first packets sent together with the indication of next routers associated with the Use columns, determining, based on the indication of next routers listed on the calculation table, whether or not the subject router has relayed a packet sent from preceding one of the routers which is upstream the subject router, using, if the subject router has not relayed a packet, a value in the Use column of the subject router as a number of second packets sent between the subject router and the destination network segment, or subtracting, if the subject router has relayed a packet, a value in the Use column of the preceding router from a value in the Use column of the subject router to use a resultant value as the number of packets, modifying the model of router-to-network traffic distribution matrix with the number of the second packets calculated to form a first router-to-network traffic distribution matrix, and managing traffic with the model of router-to-network traffic distribution matrix.

* * * * *